United States Patent [19]

Brane et al.

[11] Patent Number: 5,378,370
[45] Date of Patent: Jan. 3, 1995

[54] WATER TREATMENT TANK

[75] Inventors: Earl P. Brane, Londonderry; Boyd J. Cornell, Pickerington, both of Ohio

[73] Assignee: Wm. R. Hague, Inc., Groveport, Ohio

[21] Appl. No.: 212,583

[22] Filed: Mar. 9, 1994

Related U.S. Application Data

[60] Continuation-in-part of Ser. No. 8,791, Jan. 4, 1993, Pat. No. 5,300,230, which is a continuation of Ser. No. 782,338, Oct. 24, 1991, abandoned, which is a division of Ser. No. 493,896, Mar. 13, 1990, Pat. No. 5,089,140.

[51] Int. Cl.⁶ .............................................. C02F 1/42
[52] U.S. Cl. .................................... 210/678; 210/269;
210/275; 210/279; 210/283; 210/288; 210/290;
210/670
[58] Field of Search ............... 210/283, 290, 288, 282,
210/279, 670, 678, 677, 275, 284, 289, 290, 269

[56] References Cited

U.S. PATENT DOCUMENTS

| | | | |
|---|---|---|---|
| 661,339 | 11/1900 | Grever | 210/278 |
| 1,211,735 | 1/1917 | Magrath | 210/283 |
| 2,049,530 | 8/1936 | Van Eweyk | 210/288 |
| 2,087,442 | 7/1937 | Nack | 210/283 |
| 3,319,791 | 5/1967 | Horne | 210/288 |
| 3,554,377 | 9/1968 | Miller | 210/283 |
| 3,680,701 | 8/1972 | Holca | 210/275 |
| 3,875,053 | 4/1975 | Siegers | 210/678 |
| 3,960,721 | 6/1976 | Heskett | 210/678 |
| 4,305,826 | 12/1981 | Moses | 210/687 |
| 4,359,384 | 11/1982 | Brane et al. | 210/100 |
| 4,379,855 | 4/1983 | Down et al. | 210/677 |
| 4,642,192 | 2/1987 | Heskett | 210/903 |
| 4,851,122 | 7/1989 | Stanley | 210/290 |
| 5,050,772 | 9/1991 | Brane et al. | 210/100 |
| 5,065,901 | 11/1991 | Brane et al. | 210/100 |
| 5,089,140 | 2/1992 | Brane et al. | 210/678 |
| 5,116,491 | 5/1992 | Brane et al. | 210/278 |
| 5,122,274 | 6/1992 | Heskett | 210/758 |
| 5,135,654 | 8/1992 | Heskett | 210/763 |
| 5,157,979 | 10/1992 | Brane et al. | 74/567 |
| 5,300,230 | 4/1994 | Brane et al. | 210/670 |

FOREIGN PATENT DOCUMENTS

| | | | |
|---|---|---|---|
| 0452042 | 10/1991 | European Pat. Off. | |
| 1577803 | 7/1990 | U.S.S.R. | 210/284 |

Primary Examiner—Cynthia L. Nessler
Attorney, Agent, or Firm—Mueller and Smith

[57] ABSTRACT

A water treatment tank for use in a water treatment or softening system is disclosed which is operative in a treatment mode to receive untreated water through an inlet port and to pass treated water through an outlet port, and which is operative in a backwash mode to receive wash water through the outlet port and to pass waste water through the inlet port. Treatment tank has a vessel having an interior cavity which is partitioned into a top headspace portion, and a middle treatment bed space portion, and a bottom headspace portion via the placement of a pair of distributor filters mounted within the interior cavity to extend between the side walls thereof. The filters are spaced-apart, respectively, from the top end wall to define therewith the top headspace portion and the bottom headspace portion. A standpipe is provided to extend between and in fluid communication with the outlet port and the bottom headspace portion for conveying treated water from the bottom headspace portion to the outlet port when the treatment bed is operated in the treatment mode, and for conveying wash water from the outlet port to the bottom head space portion when the treatment tank is operated in the backwash mode. The treatment bed space portion between the first and the second distributor filter is filled with an ion-exchange resin, and a portion of the top headspace portion is filled with a particulate filter medium supported by the first distributor filter. The unfilled portion of the top headspace portion defines a freeboard space to accommodate the expansion of the filter medium when the treatment tank is operated in the backwash mode.

20 Claims, 4 Drawing Sheets

WATER TREATMENT TANK

CROSS-REFERENCE TO RELATED APPLICATIONS

This application is a continuation-in-part of U.S. application Ser. No. 08/000,791, now U.S. Pat. No. 5,300,230, filed Jan. 4, 1993, which is a continuation of U.S. application Ser. No. 07/782,338, filed Oct. 24, 1991, now abandoned, which is a division of U.S. application Ser. No. 07/493,896, now U.S. Pat. No. 5,089,140, filed Mar. 13, 1990, and entitled "Comprehensive Water Treatment System," the disclosures of which are expressly incorporated herein by reference.

BACKGROUND OF THE INVENTION

The present invention relates to water treatment systems, sometimes commonly known as water softening systems, and more particularly to a unique water treatment tank therefore containing a packed ion-exchange resin bed.

Throughout the United States, much of the municipal or groundwater used by residential and commercial consumers alike is termed "hard" as being laden with certain mineral salts including carbonates, bicarbonates, chlorides, and sulfates of calcium, magnesium, and iron. Although generally not considered harmful through contact or ingestion, hardness in water is objectionable as the calcium, magnesium, and iron ions form insoluble soaps via a reaction with soluble soaps such as sodium stearate. Insoluble soaps, due to their sticky nature, adhere to surfaces such as bathtubs to form the dreaded "ring," and to fabrics giving them a dingy appearance. Additionally, as insoluble soaps have no cleansing power, soap in excess of that needed to precipitate the calcium and magnesium in the hard water must be added in order to obtain an adequate cleansing action. The excess soap represents an added expense to be borne by the consumer.

Hard water also is responsible for the formation of a tightly adherent scale in both boilers and teapots alike. At high temperatures, many of the minerals dissolved in hard water are precipitated as insoluble, scale-forming carbonates of magnesium, calcium, and iron, or sulfates of calcium which may foul heat exchangers, water heaters, and the like. Furthermore, a such scale has a relatively high thermal conductivity, it is a poor conductor of heat and attributes to an increased fuel consumption in boilers and water heaters and exchangers.

In view of the foregoing, it is apparent that the removal the minerals responsible for hardness in service and potable water is of economic importance both for the commercial and residential consumers. For these reasons, processes have evolved for "softening" water. In this regard, an ion-exchange process has become the most widely employed method for softening water. Ion exchange, in actuality, is a chemical reaction in which mobile, hydrated ions in solution are exchanged, equivalent for quivalent, with ions such as sodium which are of a like charge, but which form soluble precipitates with soap, carbonates, bicarbonates, chlorides, and sulfates. Naturally occurring, insoluble minerals, such as the sodium aluminosilicates known as zeolite, were the first products recognized as suitable for commercial use as ion-exchange media. The zeolite solid has an open, fishnet-like microscopic structure forming interstices which may hold, for example, mobile, positively-charged sodium cations. When water containing calcium and magnesium ions is filtered slowly in a treatment tank containing a treatment bed formed of a thick layer of coarse zeolite granules, tile calcium and magnesium in the water are replaced by the sodium in the zeolite, and vice versa, to thereby soften the water. Zeolites, however, have a relatively low ion exchange capacity per unit volume, and have been replaced by higher-capacity, synthetic resin particulates, such as polystyrene-divinylbenzene, as the ion-exchange medium of choice for water treatment tanks.

In operation, any ion-exchange resin eventually will reach the limit of its ion exchange capacity for removing magnesium or calcium ions. Thereupon, the resin must be regenerated to its sodium form with a salt or brine solution. During regeneration, the tank is taken off-line, and is first backwashed with a countercurrent flow of water to cleanse and hydraulic reclassify the resin particles in the treatment bed The resin then is regenerated with a solution of common salt, i.e., sodium chloride, which simultaneously removes the magnesium and sodium ions in the form of their soluble chlorides and replaces them with sodium ions to return the resin to its sodium-based state. The regenerated resin then is rinsed free of the soluble calcium and magnesium chloride byproducts and any excess salt and finally is returned to service ready to again soften another equal volume of hard water.

As is illustrated by Moses, U.S. Pat. No. 4,305,825, equipment for the ion-exchange process heretofore has been typified by a closed, generally cylindrical treatment tank in which the ion-exchange resin is supported on a layer of graded gravel or sand to form a treatment bed. Optionally, a layer of activated carbon for adsorbing organic compounds affecting the taste, odor, or color of the water being softened, may be included as a first treatment layer supported by the ion-exchange resin layer. A standpipe or riser tube is provided to extend from an outlet port in the top of the tank to bottom of the tank. A valve assembly also is provided to control the direction of water flow through an inlet port in the top of the tank and the outlet port at the upper end of the standpipe. The treatment tank is installed in a water line for operation under the existing water pressure, and is connected to auxiliary equipment including brine- and salt-storage tanks. In service, the valve assembly is set so that raw water to be softened is made to flow from the upper inlet port downwardly through the tank wherein it is softened as it percolates through the resin portion of the treatment bed. The treated water then flows upwardly through the standpipe where it exits the tank through the outlet port. However, as the treatment bed also exerts a filtering action of the water, the bed must be periodically backwashed effecting its expansion and suspension for removing entrained particulates which were filtered from the water during the service cycle. Such backwashing, which may be accomplished concurrently with regeneration, is effected by setting the valve assembly either to redirect the water inflow or a brine solution from an auxiliary tank through the downpipe tube. The brine or water exits the pipe at the bottom of the tank, and thereafter assumes a flow through the bed in an upward direction which is countercurrent to the downward flow during service. The backwash water or expended brine solution then exits the bed through the inlet port which is now provided by the valve assembly to be in fluid communication with a drain or sewer line.

Although representing a relatively simple and economical construction, treatment tanks of the "unpacked" type exemplified by Moses have been viewed as being of a less than optimal design. For example, the stratification of the treatment bed inevitably is disturbed as the various layers thereof, which may include activated carbon for taste and odor removal, calcium carbonate for neutralization, and manganese greensand for iron removal, are intermixed during the backwashing operation. Also, owing to a high void volume fraction within the bed, the flow of water therethrough may exhibit a channeling effect characterized by a preferential flow following the path of least resistance through the bed as opposed to a uniform or plug flow which fills the entire bed.

Indeed, as early as the year 1900, experimenters have proposed alternatives to the "unpacked" or "loose" bed design common in the water treatment art. For example, Grever, U.S. Pat. No. 661,339, offered a water filtering tank internally divided into two separate compartments by a pair of diaphragms of woven wire supported on circular grates. The compartments were filled with a filtering medium, and a flow distributor plate was provided below the inlet port to distribute the inflow equally over the filtering medium. The design was stated to eliminate the channeling effect which otherwise would have been expected to occur.

Notwithstanding that the advantages of a "packed" bed design as exemplified by Grever have been known since the turn of the 19th century, such a design has heretofore yet to be successfully incorporated into a commercially-viable water treatment tank. Rather, it has been accepted that adequate cleaning of water conditioning or softening treatment beds could be effected only by expanding and fluidizing the bed during backwashing to separate its constituent particles and allow any particulate contaminants entrained therebetween to be flushed from the bed. However, this bed expansion requires the provision of a freeboard space between the upper surface of the bed and the top of the treatment tank to accommodate the volume increase of the bed as it is expanded during backwashing. In order to provide this freeboard space during backwashing while providing for a packed bed configuration during service, Miller, U.S. Pat. No. 3,554,377, has proposed internally dividing a treatment tank into a pair of bed compartments with free-floating rather than fixed diaphragms. The diaphragms also facilitate the utilization of a stratified, multi-layered treatment bed in maintaining the segregation of the layers during service and backwash. During service, the pressure of the downwardly-directed water flow moves the free-floating diaphragms downward to compact the treatment medium. Likewise, during backwash, the pressure of the upwardly-directed water or brine moves the free-floating diaphragms upward to expand the bed compartments to accommodation the expansion of the treatment medium.

However, the Miller design suffers, as have the conventional "unpacked" bed designs heretofore common in the an, from the fact that the expansion of the bed during backwash and/or regeneration significantly increases the water usage of the tank. For example, it is not uncommon for such units to use as much as 40 to 100 gallons of water during backwash/regeneration, which at the very least lessens any water savings attributable to the use of softened water. Were water a renewable rather than a finite resource, then such usage might be considered acceptable albeit somewhat uneconomical. However, as states and municipalities have recognized the imminent need for water conservation, some have gone so far as to enacted regulations imposing maximum water usage requirements for water conditioners. Thus, it is apparent that water treatment tanks offering both water savings and improved performance are needed and would be well-received by residential and commercial users alike.

BROAD STATEMENT OF THE INVENTION

The present invention is addressed to a water treatment tank for use in a water treatment or softening system which is operative in a treatment mode to receive untreated water through an inlet port and to pass treated water through an outlet port, and which is operative in a backwash mode to receive wash water through the outlet port and to pass waste water through the inlet port. The vessel of the inventive treatment tank has an interior cavity which is partitioned into a top headspace portion, a middle treatment bed space portion, and a bottom headspace portion via the placement of a pair of distributor filters mounted within the interior cavity to extend between the side walls thereof. The filters are spaced-apart, respectively, from the top and bottom end walls to define therewith the top and bottom headspace portions. A standpipe is provided to extend between and in fluid communication with the outlet port and the bottom headspace portion for conveying treated water from the bottom headspace portion to the outlet port when the treatment tank is operated in the treatment mode, and for conveying wash water from the outlet port to the bottom head space portion when the treatment tank is operated in the backwash mode. The treatment bed space portion between the first and the second distributor filter is filled with an ion-exchange resin, and a portion of the top headspace portion is filled with a particulate filter medium supported by the first distributor filter. The unfilled portion of the top headspace portion defines a freeboard space to accommodate the expansion of the filter medium when the treatment tank is operated in the backwash mode.

In having a treatment bed space portion which is filled with an ion-exchange resin, the tank of the present invention is seen to exhibit a uniform or plug flow through its treatment bed rather than the preferential or channeling flow exhibited by the "unpacked" beds heretofore common in the art. The plug flow through the treatment bed of the present invention advantageously utilizes the entire cross-section of the ion-exchange resin for increased efficiency. Also, the packing of the ion-exchange resin between the distributor filters allows for backwashing or regeneration to be effected without having to expand the resin bed. Thus, a water savings is achieved as compared to the treatment tanks which rely on bed suspension and expansion to effect the cleaning thereof. However, unlike the "packed" filter beds heretofore known in the art which could not be adequately cleaned because they could not be expanded, the resin bed of the present invention need not be expanded to be adequately backwashed. Rather, the filter medium disposed on top of the ion-exchange resin layer removes particulate contaminates, such as sediments, dirt, and the like, from the incoming water flow to an extent that the resin bed is left essentially free of such contaminants. The resin bed therefore need not be expanded during backwashing as there are, essentially, no particulate contaminants entrained therein which must be suspended and flushed therefrom. However, as the particulate contaminants are entrained within the filter medium layer, the provision of a freeboard space above that layer accommodates its expansion during backwash. An adequate cleaning of the filter medium therefore may be effected as the particulates entrained therein may be suspended and flushed from the tank as a waste water stream.

The present invention, accordingly, comprises the apparatus and method possessing the construction, combination of elements, and arrangement of parts and steps which are exemplified in the detailed disclosure to follow. An advantage of the invention includes the provision of tank for a water treatment or conditioning system having a construction with offers both water savings and an improved conditioning performance. A further advantage is an ability to provide a versatile, compact, and simple water softening, clarifying, and purifying tank which is self-cleaning and custom configured to treat any number and combination of water conditioning problems. A further advantage is an ability to utilize fine-mesh ion-exchange resins for increasing treatment capacity. These and other advantages and objects of the present invention will be readily apparent, in part, based upon the detailed disclosure which follows.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Resin-type ion exchange devices, of which the water treatment tank of the present invention is one, have many uses, such as in the softening of hard water. The active medium of such systems comprises an ion-exchange resin. As the water to be processed is passed through the resin-filled tank, objectionable ions in the fluid to be processed, e.g., calcium and magnesium, are exchanged with ions found in the resin, e.g., sodium. During this ion exchange process, the ability of the resin to exchange ions with the water to be treated gradually is reduced. That is, the resin bed becomes exhausted and, thereafter, water will flow therethrough untreated. For a given concentration of objectionable ions in the water to be processed, the capacity of the ion-exchange resin bed can be determined from the volume of resin used and the particular type of resin. As the concentration of objectionable ions in the water to be processed can be quantitatively measured, at least on an average basis, the volume of water that can be processed by a particular water treatment unit may be determined. Once that capacity of water has been treated, the bed must be regenerated.

Regeneration of the ion-exchange resin typically involves chemically replacing the objectionable ions from the resin with less objectionable ions, e.g., replacing calcium or magnesium with sodium ions. This regeneration process requires the interruption of the treatment process, thus necessitating untreated water to bypass the ion-exchange resin tank. At the same time as the ion-exchange resin is regenerated, the bed may be backwashed in order to remove trapped particulate matter, the resin tank may be rinsed to remove objectionable soluble materials, and a sterilization agent may be applied to prevent bacterial growth.

In the regeneration of resin beds used to treat hard water, a variety of control modes have been employed commercially. For example, some water softening units function on a timer which necessitates regeneration at specified time intervals. This mode of operation has the disadvantage that regeneration may be initiated notwithstanding that the resin bed still has sufficient capacity remaining to continue treatment for quite a time thereafter. Another mode of control involves monitoring the volume of water treated and provoking regeneration once a set point has been reached. Unfortunately, regeneration cycles under this mode of operation can be triggered undesirably at just the time when demand for water is high.

Regardless of the mode of control employed, the overriding consideration concerns exhaustion of the resin bed. That is, if the resin bed is permitted to become completely exhausted of its capability for exchanging ions, a single regeneration cycle will not be sufficient to establish the original capacity of the bed. Instead, several regeneration cycles often will be required. Moreover, if the bed is near its exhaustion point and a high demand for water is made, conventional commercial systems are unable to provide the capacity to soften the extra water demanded without risking total exhaustion of the resin bed. Accordingly, new water treatment systems have been developed which ensure that bed regeneration is effect prior to the point of exhaustion. Brane et al., application U.S. Ser. No. 08/000,791, describe such a method for the sequential regeneration of a system of parallel treatment tanks in response to the flow through any one tank reaching a predetermined setpoint. In this way, it is ensured that none of the tanks is completely exhausted before undergoing regeneration. Brane et al., U.S. Pat. No. 5,089,140, describe another method of operation that also prevents the exchange medium from becoming exhausted. This method forces regeneration whenever a reserve setting is reached, and additionally employs an emergency mode whereby service water is made to bypass the treatment unit so that the exchange bed may be regenerated prior to its becoming completely exhausted. Water treatment systems implementing this method are manufactured by Hague Quality Water International, 4343 S. Hamilton Road, Groveport, Ohio 43125, and are marketed under the names MAXIMIZER®️ Series 93 and 94, WATERBOSS®️, WATERMAX®️, PRO SERIES ™, and PURA-TECH®️.

Figure 1:
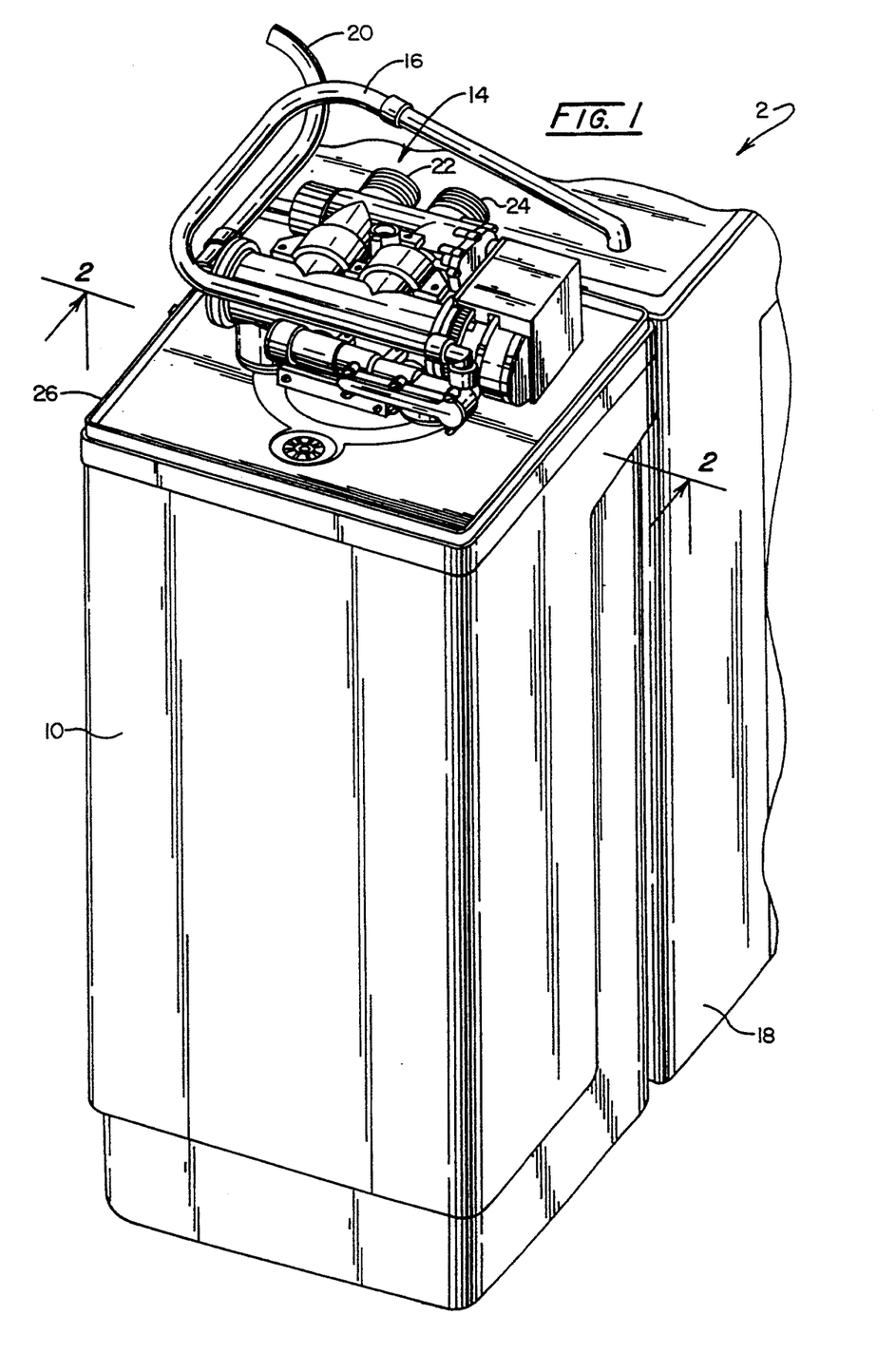
FIG. 1 is a perspective view of a water treatment system including a cabinet which houses a treatment tank in accordance with the present invention.
Figure 2:
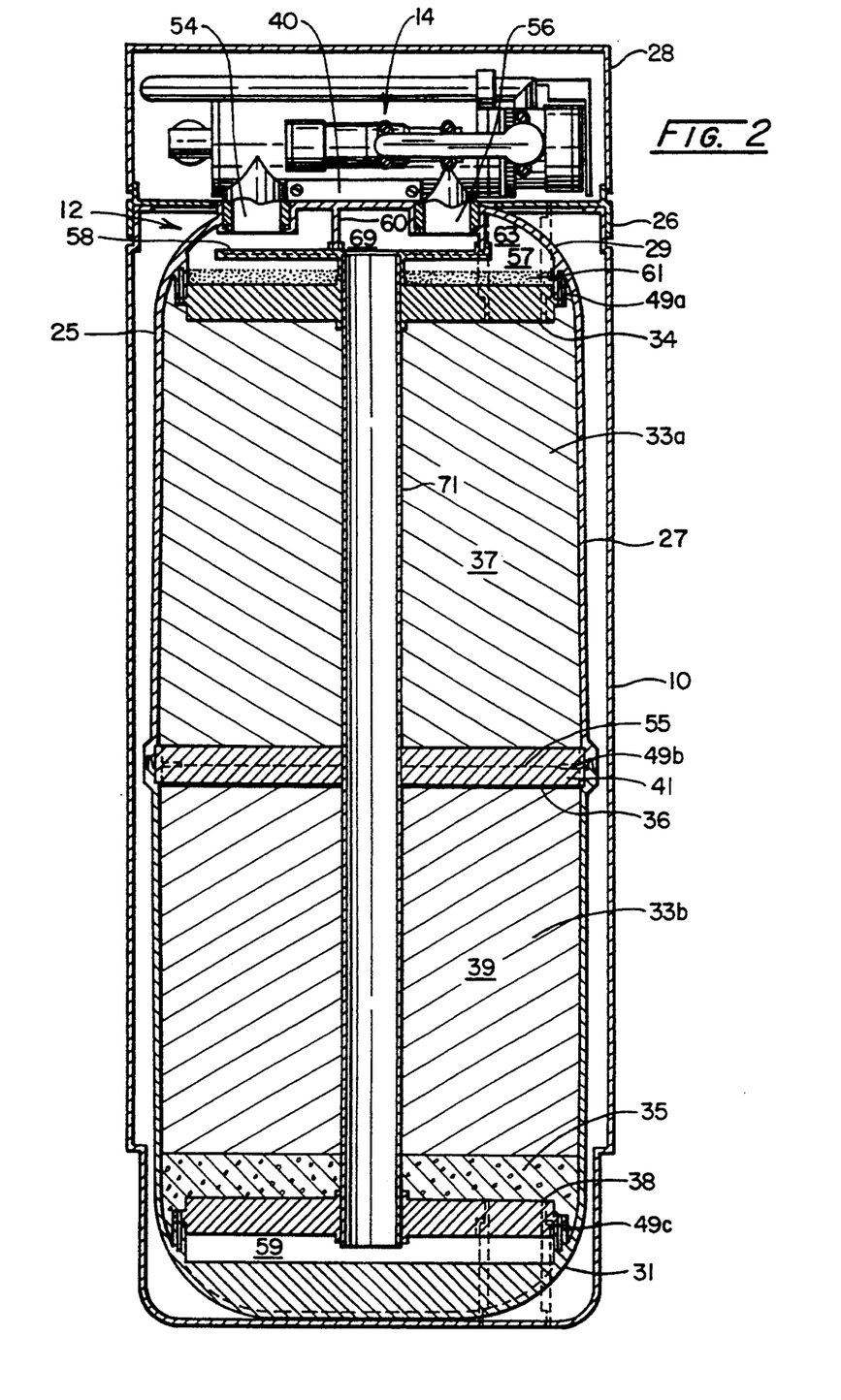
FIG. 2 is a sectional view taken through line 2—2 of FIG. 1 showing the internal structure of the treatment tank of FIG. 1.
Figure 3:
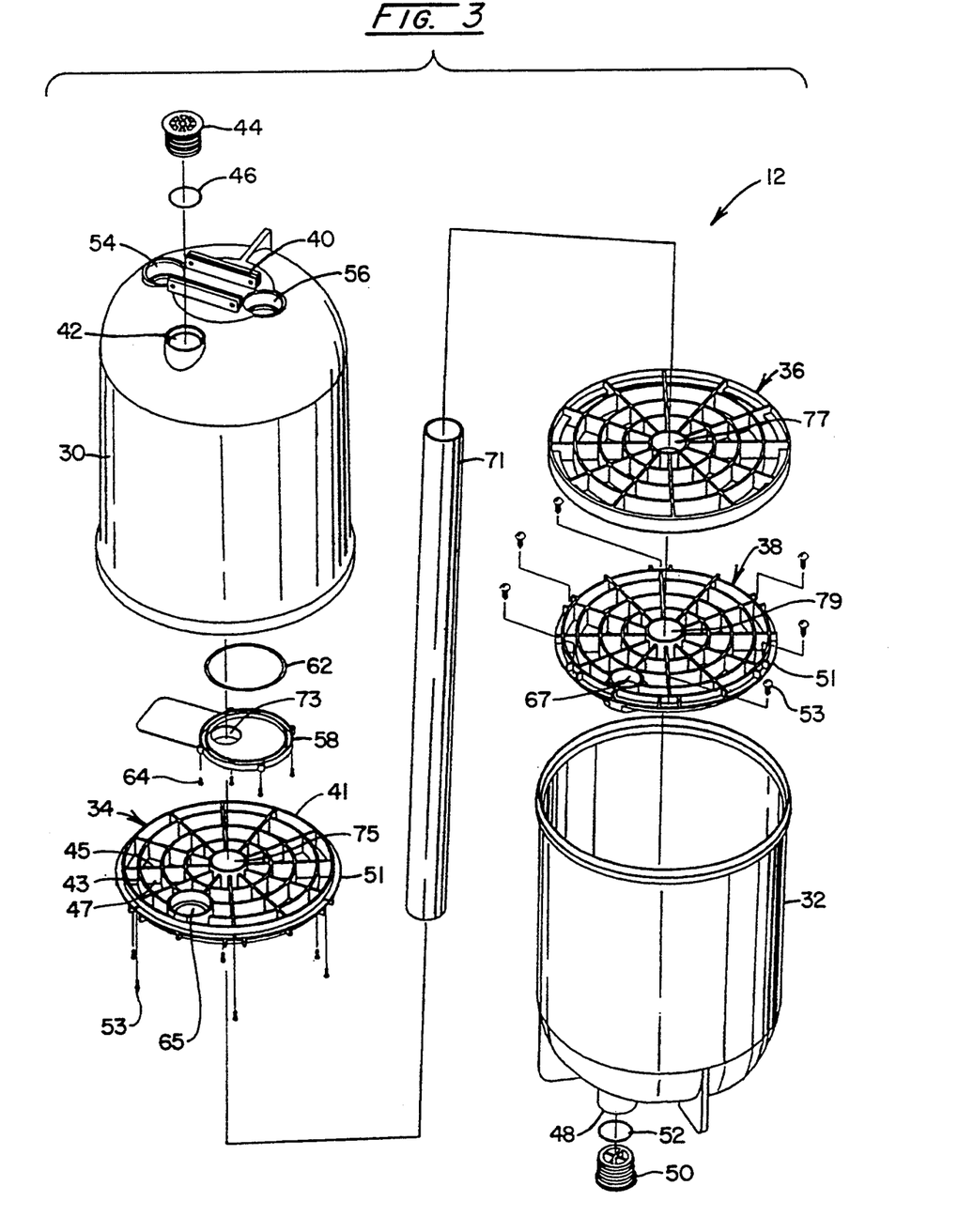
FIG. 3 is an exploded view showing the assembly of the components comprising the treatment tank of FIGS. 1 and 2.

A comprehensive water treatment system incorporating the water treatment tank of the present invention is shown generally at 2 in FIG. 1 to comprising a cabinet, 10, preferable formed of a polyvinylchloride material or the like, which houses an treatment tank shown generally at 12 (FIGS. 2 and 3). Mounted atop treatment tank 12 is a valve control assembly, 14, which may be of the "helix" type described in Brane et al., U.S. Pat. Nos. 5,157,979 and 5,116,491, the disclosures of which are expressly incorporated herein by reference. Alternatively, valve control assembly 14 may be of the eccentric cam type, and may have a housing which is integrally-molded into tank 12. For providing a brine solution to regenerate treatment tank 12, a brine storage tank, 18, is provided and is connected to treatment tank 12 via line 16. A drain line, 20, carries waste backwash or regeneration water to a drain or sewer for disposal. Incoming, untreated water is admitted through an inlet line opening, 22, with treated, softened water being withdrawn through an outlet line opening, 24. As may be seen in FIG. 2, a frame, 26, surmounts cabinet 10 for retaining a cover, 28, which houses valve control assembly 14.

Looking to FIG. 2, treatment tank 12 is shown to comprise a vessel, 25, to having upstanding side walls, 27, extending between a top end wall, 29, and a bottom end wall, 31. Although vessel 25 may be of a unitary construction, FIG. 3 shows its preferred construction as formed of an upper tank section, 30, and lower tank section, 32. Such an arrangement facilitates assembly and allows the addition of central annular sections (not shown) for increasing the volumetric capacity of tank 12 should such an increase be determined to be necessary, desirable, or convenient. For potable water treatment, it is favored that sections 30 and 32 be molded of a polypropylene material, the thermoplasticity of which advantageously allows for the consolidation of tank sections 30 and 32 via a vibration welding or another thermal joining technique. A mounting bracket, 40, may be molded into upper tank section 30 to retain valve control assembly 14.

Looking to FIGS. 2 and 3, into vessel 25 of treatment tank 12 may be seen to be fitted upper, center, and lower distributor filters which are shown, respectively, at 34, 36, and 38. As is illustrated, the use of at least three distributor filters imparts a versatility and flexibility to the design of treatment tank 12 as the interior cavity of vessel 25 may be divided into, for example, an upper treatment bed space portion, 37, and a lower treatment bed space portion, 39 (FIG. 2). Such division allows for the utilization of different combinations of treatment and ion-exchange media for tailoring the overall water conditioning performance of treatment tank 12 to meet virtually any prevailing water problem such as hardness, acidity, sediments, objectionable taste or odors, or any combination thereof. For example, with lower treatment bed space portion 39 being filled with an ion-exchange resin, such as a crosslinked styrene/divinylbenzene cation exchange resin functionalized with sodium sulfonate groups for softening purposes, upper treatment bed space portion 37 may be filled with a particulate medium or media comprising: activated carbon for clarifying and cleaning; garnet or sand for filtering; a copper/zinc alloy; an alkaline material such as calcite for neutralizing acidity; and/or silicon dioxide particles coated with manganese (BIRM®, Klack Corp., Windsor, Wis.) for removing iron. For the illustrative purposes of the present discussion, however, it may be assumed that both upper and lower treatment bed space portions 37 and 39 are filled with a synthetic, sodium-based ion-exchange resin, forming the resin beds represented at 33a and 33b.

Preferably, distributor filters 34, 36, and 38 each are constructed of a generally circular grating, as is shown at 41 (FIG. 3) for distributor 34, which has a plurality of spaced-apart, concentrically circular wall portions, one of which is shown at 43. Circular wall portions 43 are intersected by a plurality of spaced-apart, radially-extending linear wall portions, one of which is shown at 45, to define a plurality of walled, sector portions, one of which is shown at 47. During service, as water flow is received in each of sector portions 47, walls 43 and 45 thereof work to confine any radial component of the flow and to thereby assist in the maintaining a uniform or plug flow through treatment bed space portions 37 and 39. Installation of distributor filters 34, 36, and 38 into the interior of vessel 25 of tank 12 may be effected, as is shown in FIG. 2, by molding a set of flanges, 49a-c, into vessel 25, and then attaching thereto, as is shown in FIG. 3 for distributors 34 and 38, a corresponding flange, 51, of grating 41 using mechanical fasteners, one of which is shown at 53. As is vessel 25, grating 41 of distributors 34, 36, and 38 may be molded of a polypropylene material or an equivalent.

As in shown in FIG. 2 for distributor filter 36, a mesh screen, 55, or other reticulated material is provided to extend through circular grating 41 for retaining the ion-exchange resin or other treatment media within treatment bed space portions 37 and 39. Thus, screen 55 is selected as having a mesh size through which the particles of ion-exchange resin beds 33 or other treatment medium cannot pass. Accordingly, it is preferred that screen 55 is provided as having a meshing opening of 0.0056 inch (143 microns). For potable water applications, it also is preferred that screen 55 be constructed of a "food grade" material meeting federal Food and Drug Administration specifications. Such screens, formed of a polyester fabric material having an open area of about 22%, are manufactured by Tetko, Inc., of Briarcliff Manor, N.Y. and are marketed under the trade designation "7-14322."

With vessel 25 top end wall 29 and bottom end wall 31, upper and lower distributor filters 34 and 38 also define, respectively, a top headspace portion, 57, and a bottom head space portion, 59. Advantageously, top headspace portion 57 is partially filled with a particulate filter medium, 61 which is supported by upper distributor filter 34. The untilled portion of top headspace portion 57 is available as a freeboard space, 63, accommodating the expansion of filter medium 61 during backwash. In this way, filter medium 61 is provided to be self-cleaning of entrapped sediments and the like. For performance considerations, it is favored that garnet particles having a grain size of from about 0.007 inch (0.178 mm) to about 0.011 inch (0.279 mm) are used for filter medium 61. Such particles, as those available from the Garnet Abrasive Co. of Milwaukee, Wis. have an ability to filter sediments, such as dirt, ferric oxide, and the like, and down to a nominal particle size of about 0.0004 inch (10 microns).

As a result of the filtration achieved through the provision of filter medium 61 and freeboard space 63, the water flow during service to ion-exchange resin beds 33 is essentially free of sediment. Thus, ion-exchange resin beds 33 are kept essentially free of sediments during service, and therefore need not be expanded during backwash in order to effect an adequate cleaning thereof. Accordingly, treatment bed space portions 37 and 39 may be filled, i.e., packed with ion-exchange resin, preferably to form beds 33 having void fractions of about 25%. Such packing results in a generally uniform or plug flow pattern which increases the ion-exchange efficiency of resin beds 33. Moreover, as no expansion of beds 33 is necessary, appreciable water and salt savings also results. For example, it has been found that only about 15 gallons (57 liters) of water and 2.6 lb. (1.2 kg) of salt are needed to backwash and regenerate a 1 ft$^3$ (28.3 liter) treatment tank constructed in accordance with the present invention, as compared to the about 40 to 100 gallons (150 to 380 liters) of water and 6 to 8 lb. (2.7 to 3.6 kg) of salt needed to backwash and regenerate an equivalently-sized "unpacked" tank of the type heretofore common in the art.

Furthermore, the packing of bed portions 37 and 39 facilitates the use of finer mesh size resins, e.g., −30+60 U.S. Mesh, as compared to the conventional −20+50 U.S. Mesh resins commonly used in the art. A finer mesh resin is preferred as having more surface area for ion exchange transfer and, accordingly, faster exchange kinetics. However, the agitation or fluidization of such a resin, as heretofore has been known to occur during the backwashing of unpacked beds, strips it of its surface activity and results in a loss of capacity. Thus, a coarser mesh resin has been the norm as most of the ion-exchange activity therein is not appreciably affected by agitation as generally occurring within rather than on the surface of its constituent particles. However, with the packing of treatment bed space portions 37 and 39, the constituent particles of the ion-exchange resin are immobilized, and, therefore, exhibit no appreciable loss of capacity even after repeated backwashing cycles. Thus, a fine mesh resin, i.e., −30+70 U.S. Mesh, which may be of the sulfonated styrene/divinylbenzene cation exchange type, having a particle size of from about 0.0083 inch (0.21 mm) to about 0.023 inch (0.59 mm) is favored for use as the ion-exchange resin in beds 33. Such a resin is marketed under the name IONAC® C-266 by Sybron Chemicals, Inc., of Birmingham, N.J.

Preferably, as is shown in FIG. 2 at 35, a layer of purification medium is provided as a bottom treatment medium layer interposed between ion-exchange resin 33b and lower filter distributor 38. In this regard, it is well-known that chlorine gas typically is affixed with municipal water supplies to kill bacteria and other harmful organisms. Although an effective disinfectant, chlorine does impart an objectionable taste and odor to drinking water, and has been linked to such health problems as cancer, atherosclerosis, anemia, hypertension, and birth defects. However, as explained by Heskett, U.S. Pat. Nos. 4,642,192 and 5,122,274, the disclosures of which are expressly incorporated herein by reference, much of the chlorine may be removed at the point of entry of the water supply by passing it through a purification medium formed of particles of a copperzinc alloy or mixture. This purification medium is selected as having a redox potential relative to that of inorganic chlorine effective to reduce the dissolved chlorine in the water to its chloride. Additionally, as byproducts of the redox reaction, an electric field and hydrogen peroxide are generated, both of which are known to kill microorganisms such as bacteria and the like. A purification media of the preferred type is marketed under the name KDF®, 55 by KDF Fluid Treatment, Inc., of Constantine, Mich. Such media is an atomized, high purity 50% copper 50% zinc alloy having a particle size range of from about 0.0059 inch (0.149 mm) to about 0.0787 inch (2.00 mm). Advantageously, the filling or packing of lower treatment bed space portion 39 works to maintain the stratification of resin bed 33b and purification layer 35, which otherwise would be seen to intertrax during backwashing.

For filling upper headspace portion 57 and upper treatment bed space portion 37 with filter, purification, and/or ion-exchange media or the like upon the assembly of vessel 25, an upper fill aperture, 42 (FIG. 3), is provided in upper tank section 30. To provide for the withdrawal of media by inversion of vessel 25, upper fill aperture 42 desirably is configured for a threadably removable engagement with a corresponding fill plug, 44. An 0-ring, 46, is interposed between upper fill aperture 42 and fill plug 44 to ensure that a hermetic seal is achieved therebetween. Access for filling upper treatment bed space portion 57 through upper fill aperture 42 is provided via an upper distributor filter aperture, 65, which is sealed thereafter with a plug (not shown). In a similar manner, for filling or draining lower headspace position 59 and lower treatment bed space portion 39, lower tank section 32 is provided with a lower fill aperture 48 receiving a corresponding fill plug, 50, and an associated 0-ring, 52. For access to lower treatment bed space portion 39 through lower fill aperture 48, lower distributor filter 38 is provided with a lower distributor filter aperture, 67, and an associated plug (not shown). It is preferred that the filling of upper and lower treatment bed space portions 37 and 39 is effected under vacuum and with the vibration of tank 25 to facilitate the packing of ion-exchange resin beds 33.

Corresponding, respectively, to inlet line opening 22 and outlet line opening 24, top end wall 29 of vessel 25 upper tank section 30 further is provided with an inlet port, 54, and outlet port, 56. Below inlet port 54 in upper headspace portion 57, a flange or baffle, 58, having an associated 0-ring, 62, is positioned to deflect untreated, service water admitted through inlet port 54 uniformly over upper distributor filter 34. In this way, baffle 58 cooperates with gratings 41 of filter distributors 34, 36, and 38 to maintain a uniform, plug flow through ion-exchange resin 33. Baffle 58 may be mated with mechanical fasteners, one of which is shown at 64 (FIG. 3), to a downwardly projecting flange, 60 (FIG. 2), which is molded into upper section 30 of vessel 25. The mating of baffle 58 and flange 60 defines a cavity, 69, which provides fluid communication between outlet port 56 and a center standpipe, 71. Standpipe 71, in turn, extends in fluid communication to lower head space 59 for conveying treated water therefrom to outlet port 56 when treatment tank 12 is operated in a treatment mode, and for conveying wash water from outlet port 56 to bottom head space portion 59 when treatment tank 12 is operated in a backwash mode. Stand pipe 71 is received through apertures 73, 75, 77, and 79, formed into, respectively, baffle 58, and filter distributors 34, 36, and 38.

In operation, the position of valve control assembly 14 is automatically controlled via a control system which may employ a microprocessor as is described in Brane et. al, U.S. Pat. No. 5,089,140. The position of valve control assembly 14 determines the water flow path through treatment tank 12, as well as the admittance of service water, backwash water, or regeneration brine. Thus, treatment and regeneration backwash modes are established for the operation of tank 12.

In the treatment mode of operation, tank 12 generally receives untreated, service water through inlet port 54 and passes treated, i.e., filtered, purified, and conditioned/softened water through outlet port 56. That is, service water flow is admitted via inlet port 54 into upper headspace portion 57 and onto baffle 58, which effects its uniform distribution over filter media 61 and upper filter distributor 58. The water thus distributed passes sequentially through the filter medium 61, wherein entrained sediments are filtered therefrom. The water flow then proceeds downwardly through upper resin bed 33a, center filter distributor 34, lower resin bed 33b, purification medium 35, and lower filter distributor 38 whereupon it is received in lower headspace portion 59 as treated water. The treated water in lower headspace portion 59 then assumes an upward flow through standpipe 71 and into cavity 60 for its passage from vessel 25 through outlet port 56 as a treated water stream.

In the backwash/regeneration mode of operation, which may be initiated by a sensor/monitor in response to a predetermined setpoint, wash water or regeneration brine is made to be received through outlet port 56 and into cavity 60, whereupon it assumes a generally downward flow through standpipe 71 and into lower headspace portion 59. From lower headspace portion 59, the wash water or regeneration brine assumes an upward flow through, successively, lower filter distributor 38, purification medium 35, lower resin bed 33b, center filter distributor 36, upper resin bed 33a, upper filter distributor, 34, filter medium 61, and into upper headspace portion 57. From upper headspace portion 57, the brine or wash water exits vessel 25 as a waste water stream through inlet port 54.

Figure 4A:
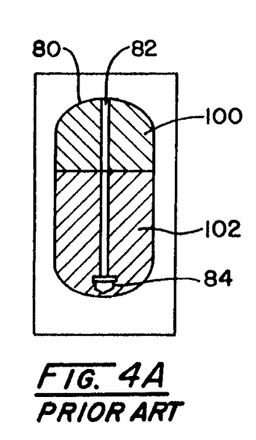
FIGS. 4a-d are schematic representations showing the progression of the water flow and resin exhaustion pattern in an "unpacked" treatment bed according to the prior art.
Figure 4B:
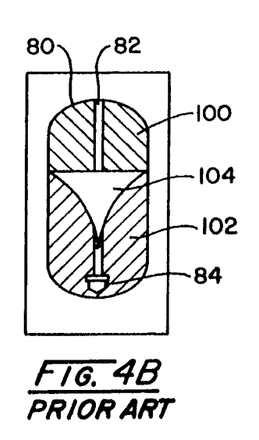
Figure 4C:
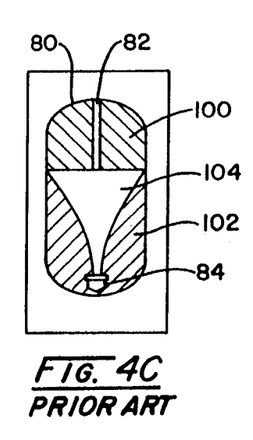
Figure 4D:
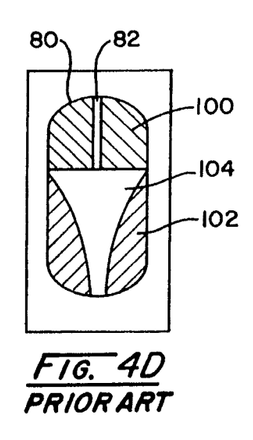
Figure 5A:
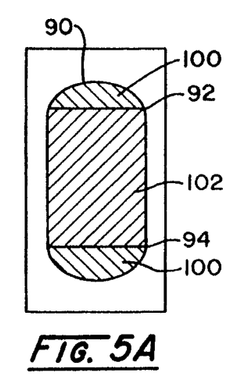
FIGS. 5a-d are schematic representations showing the progression of the water flow and resin exhaustion pattern in a "packed" treatment bed according to the present invention.
Figure 5B:
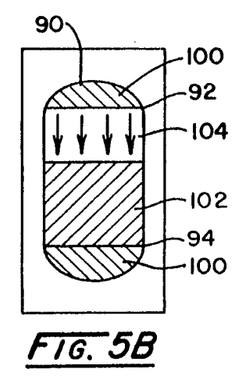
Figure 5C:
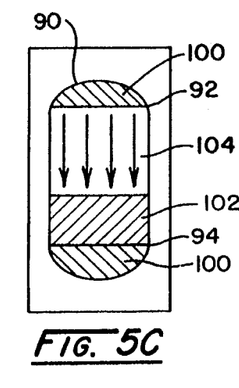
Figure 5D:
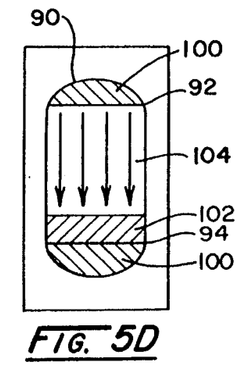

Looking lastly to FIG. 4, the water treatment performance of a treatment tank according to the present invention, 90, is illustrated sequentially in FIG. 4b, as contrasted the performance of an "unpacked" bed design according to the prior art, 90, as shown in FIG. 4a. The qualitative results shown in FIG. 4 were observed experimentally using a transparent tank and flow water marked with a dye. In FIG. 4, water is represented as at 100, ion-exchange resin as at 102, and exhausted ion-exchange resin as at 104.

Considering initially prior an tank 80, which is shown to have a standpipe, 82, terminating at an outlet, 84, the flow path, as a result of channeling, is seen to exhibit a generally conical pattern towards outlet 84. In FIGS. 4a(3) and (4), the conical flow pattern is seen to manifest itself as a premature hardness breakthrough, i.e., water leaves the bed untreated, wherein much of resin 102 is bypassed. The bypassed resin 102 is considered wasted as regeneration must be initiated upon hardness breakthrough not withstanding that only a small total volume of the resin bed actually has been exhausted.

Considering next tank 90 of the present invention, wherein resin 102 is contained between an upper filter distributor, 92, and a lower filter distributor, 94, a uniformly distributed or plug flow pattern through resin 102 is exhibited. Such pattern, as is shown in FIGS. 4b(2)–(4), results in an increased treatment efficiency in utilizing the entire capacity of the resin bed with no premature hardness breakthrough. Also, as filter distributors 92 and 94 have relatively more open area as compared to outlet 84 of prior an tank 80, tank 90 is seen to exhibit a correspondingly lower pressure drop as compared to an equivalently-sized tank 80.

Furthermore, when the water flow direction is reversed for backwashing and regeneration, it may be seen in FIG. 4b(4) that the wash and/or regeneration water entering tank 90 first contacts fresh resin 102. Thus, the backwashing and regeneration of tank 90 of the present invention is effected with softened and, if a purification medium is used as a bottom treatment layer, with purified water. In contrast, as may be appreciated from FIG. 4a(4), wash and/or regeneration water entering prior an tank 80 again will assume a non-uniform, channeled flow path which bypasses fresh resin 102. Accordingly, the backwashing and regeneration of prior an tank 80 therefore is effected with water which is essentially untreated, resulting in an increase in both water and salt consumption and deleterious affecting water purity once the tank is placed back into service. Improved backwashing and resin regeneration therefore may be seen as a further precept of the present invention.

It is anticipated that certain changes may be made in the apparatus and method described hereinbefore without departing from the scope of the invention herein involved. In this regard, it will be appreciated that although the filter medium is shown as supported on an upper filter distributor, the flexibility of the design of the present invention would allow it to be disposed on a center filter distributor were the upper treatment bed space portion to be left unfilled. In such configuration, the unfilled portion of the treatment space would function as a freeboard space to accommodate the expansion of the filter medium during backwash. Also, the center filter distributor may be removed to apportion the interior of the vessel into a single treatment bed space portion. Two or more treatment tanks according to the present invention may be joined in parallel to allow for greater throughput. As still other configurations based on the general design disclosed herein now will become obvious to those of ordinary skill, the precepts of the present invention extend beyond any one preferred bed configuration. Accordingly, it is intended that all matter contained in the foregoing description of the invention or shown in the accompanying drawings shall be interpreted as illustrative rather than in a limiting sense.

What is claimed:

1. A treatment tank for a water treatment system operative in a treatment mode to receive untreated water through an inlet port means and to pass treated water through an outlet port means and operative in a backwash mode to receive wash water through said outlet port means and to pass waste water through said inlet port means, said treatment tank comprising:

a vessel having upstanding side walls extending between a top end wall and a bottom end wall to define an interior cavity, said top end wall having a pair of openings therethrough in fluid communication with said interior cavity to define said inlet port means and said outlet port means;

a first distributor filter mounted within said interior cavity to extend between said side walls and spaced-apart from said top end wall to define a top headspace portion therebetween;

a second distributor filter mounted within said interior cavity to extend between said side walls intermediate said first distributor filter and said bottom end wall, said second distributor filter spaced-apart from said bottom end wall to define a bottom headspace portion therebetween and from said first distributor filter to define a treatment bed space portion therebetween;

a standpipe extending between and in fluid communication with said outlet port means and said bottom headspace portion, said standpipe defining means for conveying treated water from said bottom headspace portion to said outlet port means when said treatment tank is operated in said treatment mode, and for conveying wash water from said outlet port means to said bottom head space portion when said treatment tank is operated in said backwash mode;

a particulate ion-exchange resin filling said treatment bed space portion between said first and said second distributor filter; and a particulate filter medium supported by said first distributor filter and filling a portion of said top headspace portion, the unfilled portion of said top headspace portion defining a freeboard space, said freeboard space providing means for accommodating the expansion of said filter medium when said treatment tank is operated in the backwash mode.

2. The treatment tank of claim 1 further comprising a third distributor filter interposed between said first distributor filter and said second distributor filter to divide said treatment bed space portion into an upper and a lower treatment bed space portion, said ion-exchange resin filling said lower treatment bed space portion.

3. The treatment tank of claim 2 wherein said upper treatment bed space portion is filled with a particulate treatment medium selected from the group consisting of an ion exchange resin, activated carbon, calcite, a copper/zinc alloy, garnet, silicon dioxide particles coated with manganese dioxide, and mixtures thereof.

4. The treatment tank of claim 1 wherein said particulate filter medium comprises garnet particles having a grain size of from about 0.007 inch (0.178 mm) to about 0.011 inch (0.279 mm).

5. The treatment tank of claim 1 wherein said ion-exchange resin is a cross-linked styrene-divinylbenzene cation exchange resin functionalized with sodium sulfonate groups and having a particle size of from about 0.0083 inch (0.21 mm) to about 0.023 inch (0.59 mm).

6. The treatment tank of claim 1 further comprising layer of a purification medium interposed between said ion-exchange resin and said second distributor filter, said purification medium comprising particles of a copper/zinc alloy having a redox potential relative to that of inorganic chlorine effective to reduce at least a portion of any inorganic chlorine in said untreated water.

7. The treatment tank of claim 6 wherein said purification medium has a particle size range of from about 0.0059 inch (0.149 mm) to about 0.0787 inch (2.00 mm).

8. The treatment tank of claim 1 wherein each said distributor filter comprises:
a generally circular grating formed of a plurality of spaced-apart, concentrically circular wall portions intersected by a plurality of spaced-apart, radially-extending linear wall portions, the intersections of said circular and said linear wall portions defining walled sector portions radially confining water flow through said grating; and
a mesh screen extending through said circular grating for retaining said ion-exchange resin within said treatment bed space portion.

9. The treatment tank of claim 8 wherein said mesh screen comprises a polyester fabric having a mesh opening of about 0.0056 inch (143 microns).

10. The treatment tank of claim 1 further comprising a baffle positioned below said inlet port means to distribute untreated water admitted through said inlet port means uniformly over said first distributor filter.

11. A water filtering and softening method comprising the steps of:
(a) providing a water treatment tank operative in a treatment mode to receive untreated water through an inlet port means and to pass treated water through an outlet port means, and operative in a backwash mode to receive wash water through said outlet port means and to pass waste water through said inlet port means, said treatment tank comprising:
a vessel having upstanding side walls extending between a top end wall and a bottom end wall to define an interior cavity, said top end wall having a pair of openings therethrough in fluid communication with said interior cavity to define an inlet port means and an outlet port means;
a first distributor filter mounted within said interior cavity to extend between said side walls and spaced-apart from said top end wall to define a top headspace portion therebetween;
a second distributor filter mounted within said interior cavity to extend between said side walls intermediate said first distributor filter and said bottom end wall, said second distributor filter spaced-apart from said bottom end wall to define a bottom headspace portion therebetween and from said first distributor filter to define a treatment bed space portion therebetween;
a standpipe extending between and in fluid communication with said outlet port means and said bottom headspace portion, said stand pipe defining means for conveying treated water from said bottom headspace portion to said outlet port means when said treatment tank is operated in said treatment mode, and for conveying wash water from said outlet port means to said bottom head space portion when said treatment tank is operated in said backwash mode;
a particulate ion-exchange resin filling said treatment bed space portion between said first and said second distributor filter; and
a particulate filter medium supported by said first distributor filter and filling a portion of said top headspace portion, the unfilled portion of said top headspace portion defining a freeboard space, said free board space providing means for accommodating the expansion of said filter medium when said treatment tank is operated in said backwash mode;
(b) operating said treatment tank in said treatment mode to pass untreated water through said filter medium and said ion-exchange resin and out through said standpipe until said resin is in need of regeneration; and
(c) operating said treatment tank in said backwash mode to wash said filter medium.

12. The method of claim 11 wherein said treatment tank further comprises a third distributor filter interposed between said first distributor filter and said second distributor filter to divide said treatment bed space portion into an upper and a lower treatment bed space portion, said ion-exchange resin filling said lower treatment bed space portion.

13. The method of claim 12 wherein said upper treatment bed space portion of said treatment tank is filled with a treatment medium selected from the group consisting of an ion exchange resin, activated carbon, calcite, a copper/zinc alloy, garnet, silicon dioxide particles coated with manganese dioxide, and mixtures thereof.

14. The method of claim 11 wherein said particulate filter medium of said treatment tank comprises garnet particles having a grain size of from about 0.007 inch (0.178 mm) to about 0.011 inch (0.279 mm).

15. The method of claim 11 wherein said ion-exchange resin of said treatment tank is a crosslinked styrene-divinylbenzene cation exchange resin functionalized with sodium sulfonate groups and having a particle size of from about 0.0083 inch (0.21 mm) to about 0.023 inch (0.59 mm).

16. The method of claim 11 wherein said treatment tank further comprises layer of a purification medium interposed between said ion-exchange resin and said second distributor filter, said purification medium comprising particles of a copper/zinc alloy having a redox potential relative to that of inorganic chlorine effective to reduce: at least a portion of any inorganic chlorine in said untreated water.

17. The method of claim 16 wherein said purification medium has a particle size range of from about 0.0059 inch (0.149 mm) to about 0.0787 inch (2.00 mm).

18. The method of claim 11 wherein each said distributor filter of said treatment tank each comprises:

a generally circular grating formed of a plurality of spaced-apart, concentrically circular wall portions intersected by a plurality of spaced-apart, radially-extending linear wall portions, the intersections of said circular and said linear wall portions defining walled sector portions radially confining water flow through said grating; and a mesh screen extending through said circular grating for retaining said ion-exchange resin within said treatment bed space portion.

19. The method of claim 18 wherein said mesh screen comprises a polyester fabric having a mesh opening of about 0.0056 inch (143 microns).

20. The method of claim 11 wherein said treatment tank further comprises a baffle positioned below said inlet port means to distribute untreated water admitted through said inlet port means uniformly over said first distributor filter.

* * * * *